(12) United States Patent
Mills

(10) Patent No.: US 8,371,326 B2
(45) Date of Patent: Feb. 12, 2013

(54) FUEL VAPOR VENT VALVE WITH DYNAMIC PRESSURE RELIEF

(75) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 402 days.

(21) Appl. No.: 12/767,856

(22) Filed: Apr. 27, 2010

(65) Prior Publication Data

US 2010/0282335 A1    Nov. 11, 2010

Related U.S. Application Data

(60) Provisional application No. 61/176,998, filed on May 11, 2009.

(51) Int. Cl.
*F16K 24/04* (2006.01)
(52) U.S. Cl. .......................... 137/202; 137/43
(58) Field of Classification Search ............ 137/43, 137/20, 493.8, 505.13, 512.1, 512.2, 512.3, 137/599.16, 599.18, 601.13, 601.2, 601.212
See application file for complete search history.

(56) References Cited

U.S. PATENT DOCUMENTS

| | | | |
|---|---|---|---|
| 3,970,098 A * | 7/1976 | Boswank et al. ............. 137/39 |
| 4,023,583 A | 5/1977 | Parkinson | |
| 4,739,808 A | 4/1988 | Schmidt | |
| RE34,518 E | 1/1994 | Covert et al. | |
| 5,582,198 A | 12/1996 | Nagino et al. | |
| 5,666,989 A * | 9/1997 | Roetker ..................... 137/43 |
| 5,992,441 A | 11/1999 | Enge et al. | |
| 6,250,325 B1 | 6/2001 | Kim | |
| 6,564,821 B1 | 5/2003 | Orenstein et al. | |
| 6,612,324 B2 | 9/2003 | Szlaga | |
| 6,918,405 B2 | 7/2005 | Leonhardt | |
| 7,063,101 B2 | 6/2006 | Williamson et al. | |
| 7,143,783 B2 * | 12/2006 | Emke et al. ............. 137/512.1 |
| 7,147,017 B2 | 12/2006 | Leonhardt | |
| 7,163,023 B2 | 1/2007 | Spink et al. | |
| 7,201,155 B2 | 4/2007 | Mills | |
| 7,207,347 B2 | 4/2007 | Olshanetsky et al. | |
| 7,491,258 B2 | 2/2009 | Gouzou et al. | |
| 7,527,064 B2 | 5/2009 | Kito et al. | |

OTHER PUBLICATIONS

International Search Report of Corresponding PCT application (PCT/IB2010/001082), Sep. 20, 2010.

* cited by examiner

*Primary Examiner* — Eric Keasel
*Assistant Examiner* — Kevin E Lynn
(74) *Attorney, Agent, or Firm* — Quinn Law Group, PLLC

(57) ABSTRACT

A fuel vapor vent valve assembly includes an anti-trickle valve having a casing defining a first cavity. A movable element is disposed within the first cavity. The casing defines a lower dynamic vapor passage in fluid communication with an interior of a fuel tank. A concave ramp is disposed concentrically about the lower dynamic vapor passage, within the first cavity. The movable element moves upward along the concave ramp in response to a change in motion to open fluid communication through the lower dynamic vapor passage to vent vapor pressure from within the fuel tank during movement.

20 Claims, 3 Drawing Sheets

FUEL VAPOR VENT VALVE WITH DYNAMIC PRESSURE RELIEF

CROSS-REFERENCE TO RELATED APPLICATIONS

This application claims the benefit if U.S. Provisional Patent Application Ser. No. 61/176,998, filed on May 11, 2009, the disclosure of which is hereby incorporated by reference.

TECHNICAL FIELD

The invention generally relates to a fuel vapor vent valve assembly, and more specifically to an anti-trickle valve for the fuel vapor vent valve assembly.

BACKGROUND

Fuel storage systems for vehicles include a fuel tank. The fuel tank includes an inlet, to which a filler pipe is attached, through which fuel is dispensed into the tank. The fuel tank further includes an outlet, through which fuel is directed to an engine. The fuel tank may further include a fuel vapor vent valve assembly, disposed on a top wall of the fuel tank. The fuel vapor vent valve assembly provides an outlet to vent fuel vapors from within an interior of the fuel tank.

During refueling of the fuel tank, operation of the vehicle, or as a result of temperature change of the fuel, the vapor pressure within the tank may change, i.e., increase or decrease. The fuel vapor vent valve assembly vents the fuel vapor from within the fuel tank to maintain a vapor head within a predetermined range when the vapor pressure rises above the predetermined range. The fuel vapor vent valve assembly may further include a liquid/vapor discriminator, commonly referred to as a roll-over valve. The liquid/vapor discriminator is configured to allow the fuel vapors to pass through the fuel vapor vent valve assembly during normal operating conditions, but is configured to block fluid communication between the fuel tank and the fuel vapor vent valve assembly when the fuel tank is oriented at an extreme angle or upside down, such as in the event of a vehicular roll-over. The fuel tank may further include a vacuum relief valve, which is configured to relieve a vacuum pressure from within the fuel tank.

SUMMARY

A fuel vapor vent valve assembly for a fuel tank of a vehicle is provided. The vent valve assembly includes a housing having an outlet, and defining an interior opening. The interior opening is in fluid communication with the outlet. The fuel vapor vent valve assembly further includes a liquid/vapor discriminator coupled to the housing. The liquid/vapor discriminator is movable between an open position and a closed position. When in the open position, the liquid/vapor discriminator allows fluid communication between an interior of the fuel tank and the interior opening of the housing. When in the closed position, the liquid/vapor discriminator prevents fluid communication between the interior of the fuel tank and the interior opening of the housing. The fuel vapor vent valve assembly further includes an anti-trickle valve disposed within the interior opening of the housing. The anti-trickle valve opens and closes fluid communication between the interior opening of the housing and the liquid/vapor discriminator to selectively allow fluid communication between the interior opening of the housing and the interior of the fuel tank when the liquid/vapor discriminator is in the open position. The anti-trickle valve includes a dynamic pressure relief mechanism, which includes a movable element. The movable element opens fluid communication between the interior opening of the housing and the liquid/vapor discriminator in response to a change in motion, to vent vapor pressure from the interior of the fuel tank.

An anti-trickle valve for a fuel vapor vent assembly of a fuel tank of a vehicle is also provided. The anti-trickle valve includes a casing including an upper portion and a lower portion. The upper portion defines an upper dynamic vapor passage and an upper vacuum relief vapor passage. The lower portion defines a lower dynamic vapor passage and a lower vacuum relief vapor passage. The upper portion and the lower portion of the casing cooperate to define a first cavity in fluid communication with the upper dynamic vapor passage and the lower dynamic vapor passage, and a second cavity in fluid communication with the upper vacuum relief vapor passage and the lower vacuum relief vapor passage. The anti-trickle valve further includes a float disposed within the second cavity. The float seals against the upper vacuum relief vapor passage when a vapor pressure in the fuel tank exceeds a predetermined value. The float also withdraws from sealing engagement with the upper vacuum relief vapor passage when a vacuum pressure from within the fuel tank falls below the predetermined value to open fluid communication between the upper vacuum relief vapor passage and the lower vacuum relief vapor passage. The anti-trickle valve further includes a movable element disposed within the first cavity. The movable element opens fluid communication between the upper dynamic vapor passage and the lower dynamic vapor passage in response to a change in motion, to vent vapor pressure from within the fuel tank during movement of the vehicle.

Accordingly, the movable element allows the anti-trickle valve to vent fuel vapors from within the fuel tank in response to movement of the vehicle. As the vapor pressure within the tank rises during operation of the vehicle, for example, by the fuel sloshing and/or an increase in temperature of the fuel, the movable element moves within the first cavity to open fluid communication between the upper dynamic vapor passage and the lower dynamic vapor passage. Once the vehicle comes to rest, the movable element moves back into sealing engagement with the lower dynamic vapor passage to close fluid communication between the upper dynamic vapor passage and the lower dynamic vapor passage.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the different views, a fuel vapor vent valve assembly is shown generally at 20. The fuel vapor vent valve assembly 20 is for a fuel tank 22 of a vehicle (not shown). The fuel vapor vent valve assembly 20 controls the flow of vapors out of and into the fuel tank 22 to regulate a vapor pressure head within an interior 21 of the fuel tank 22. Accordingly, the fuel vapor vent valve assembly 20 releases fuel vapors and/or air from within the fuel tank 22 to vent the fuel tank 22 and permits air flow into the fuel tank 22 in response to a vacuum pressure within the fuel tank 22.

Figure 1:
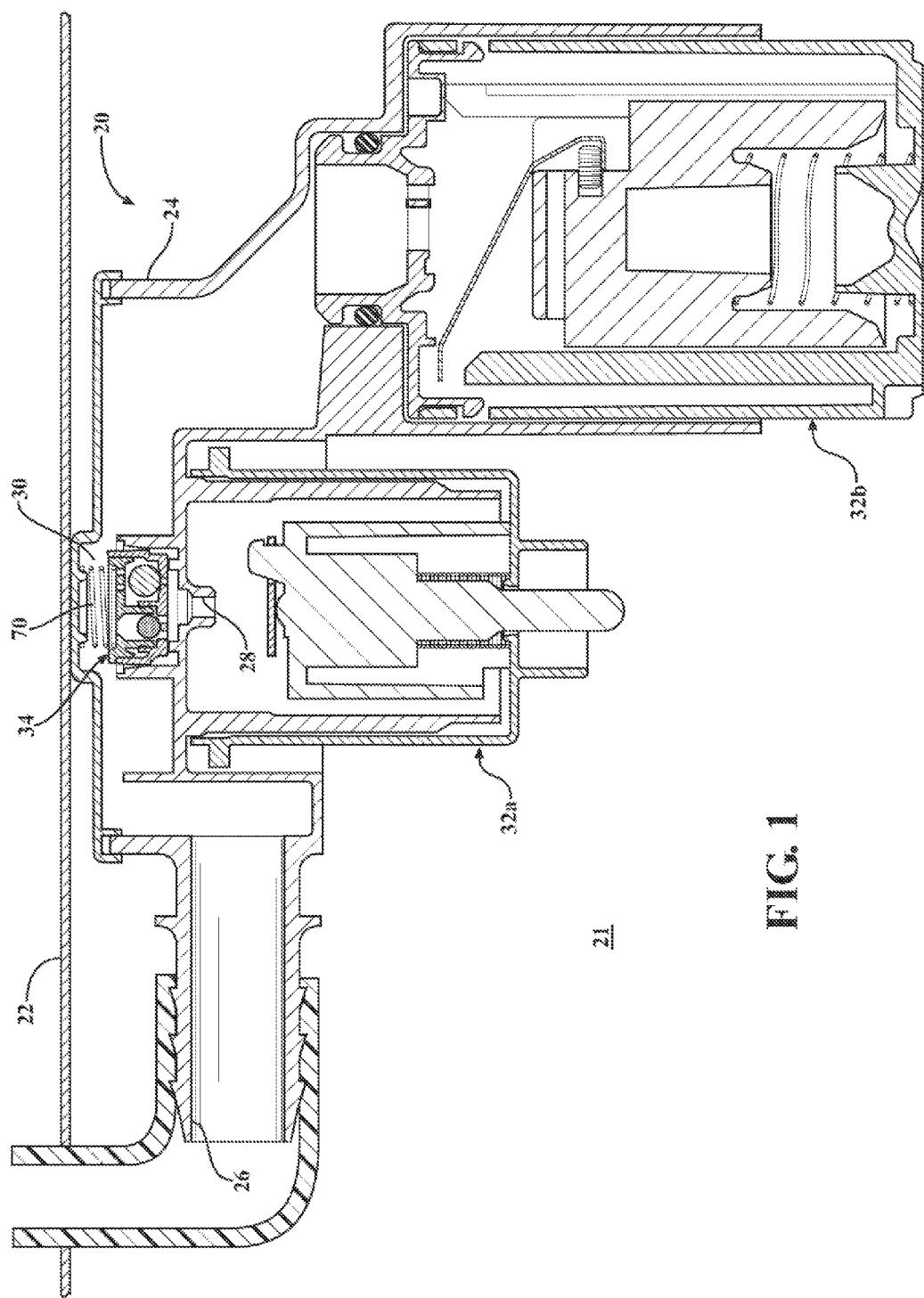
FIG. 1 is a schematic cross sectional view of a fuel vapor vent valve assembly.

Referring to FIG. 1, the fuel vapor vent valve assembly 20 includes a housing 24. The housing 24 defines an outlet 26, a vapor port 28, and an interior opening 30 in fluid communication with the outlet 26 and the vapor port 28. The outlet 26 may be, but is not required to be, connected to some other component, such as a vapor canister (not shown). However, the outlet 26 is maintained at atmospheric pressure. Any vapors vented from the fuel tank 22 are exhausted through the outlet 26. The vapor port 28 is in fluid communication with fuel tank 22. The interior opening 30 of the housing 24 is disposed between the outlet 26 and the vapor port 28.

The fuel vapor vent valve assembly 20 includes a liquid/vapor discriminator 32a, 32b, commonly referred to as a roll-over valve. The liquid/vapor discriminator 32a, 32b is coupled to the housing 24, adjacent to and in fluid communication with the vapor port 28. Accordingly, the vapor port 28 connects the interior opening 30 of the housing 24 and the liquid/vapor discriminator 32a, 32b. The liquid/vapor discriminator 32a, 32b is movable between an open position and a closed position. When in the open position, the liquid/vapor discriminator 32a, 32b allows fluid communication, particularly vapor communication, between an interior of the fuel tank 22 and the interior opening 30 of the housing 24. When in the closed position, the liquid/vapor discriminator 32a, 32b is configured to prevent fluid communication, including vapor communication, between the interior of the fuel tank 22 and the interior opening 30 of the housing 24. The liquid/vapor discriminator 32a, 32b operates to prevent liquid fuel spillage from the fuel tank 22 when the fuel tank 22 is disposed at extreme angles or upside-down, such as during a roll-over event. The liquid/vapor discriminator 32a, 32b may be designed and/or configured in any suitable manner that restricts liquid fuel from spilling from the fuel tank 22 when the fuel tank is disposed at an extreme angle or upside down.

As shown, the fuel vapor vent valve assembly 20 includes a first liquid/vapor discriminator 32a and a second liquid/vapor discriminator 32b. The first liquid/vapor discriminator 32a and the second liquid/vapor discriminator 32b are vertically offset from each other to open and/or close fluid communication between the fuel tank 22 and the interior opening 30 of the housing 24 at different fuel levels within the fuel tank 22. However, it should be appreciated that the fuel vapor vent assembly need not include both the first liquid/vapor discriminator 32a and the second liquid/vapor discriminator 32b. Furthermore, it should be appreciated that the first liquid/vapor discriminator 32a and the second liquid/vapor discriminator 32b, need not both be disposed in the housing 24, i.e, the first liquid/vapor discriminator 32a and the second liquid/vapor discriminator 32b may be separate and independent units.

Figure 2:
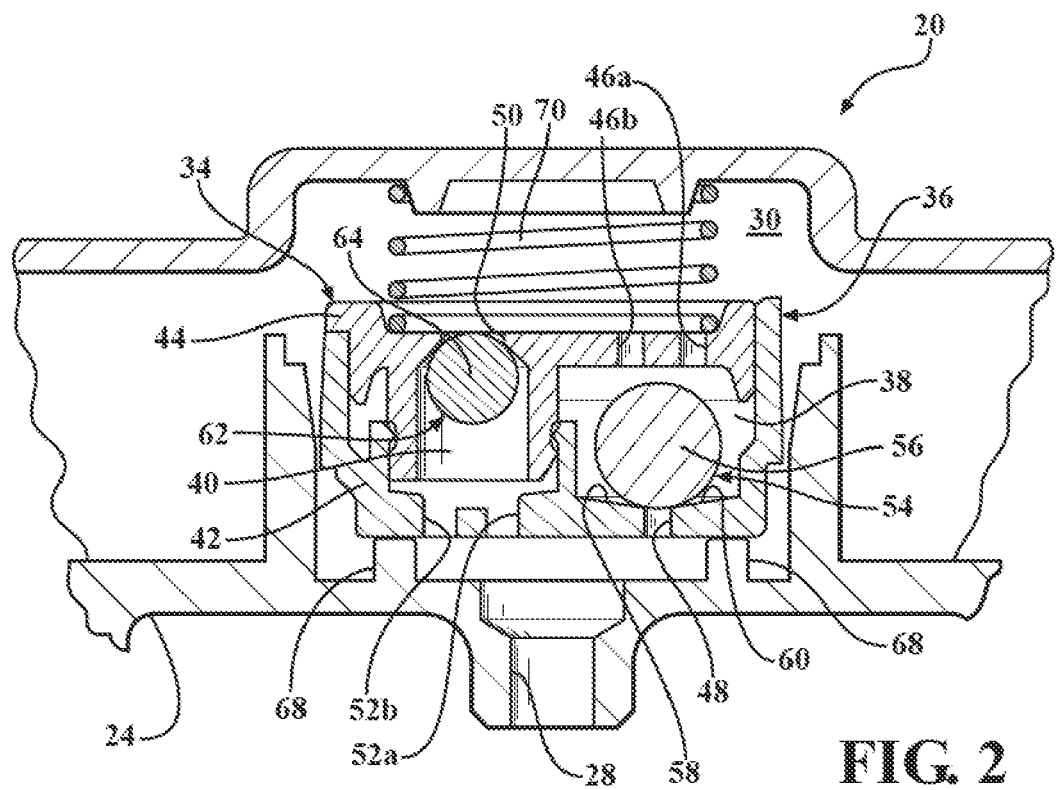
FIG. 2 is an enlarged partial schematic cross sectional view of the fuel vapor vent valve assembly, showing an anti-trickle valve in a first position.
Figure 3:
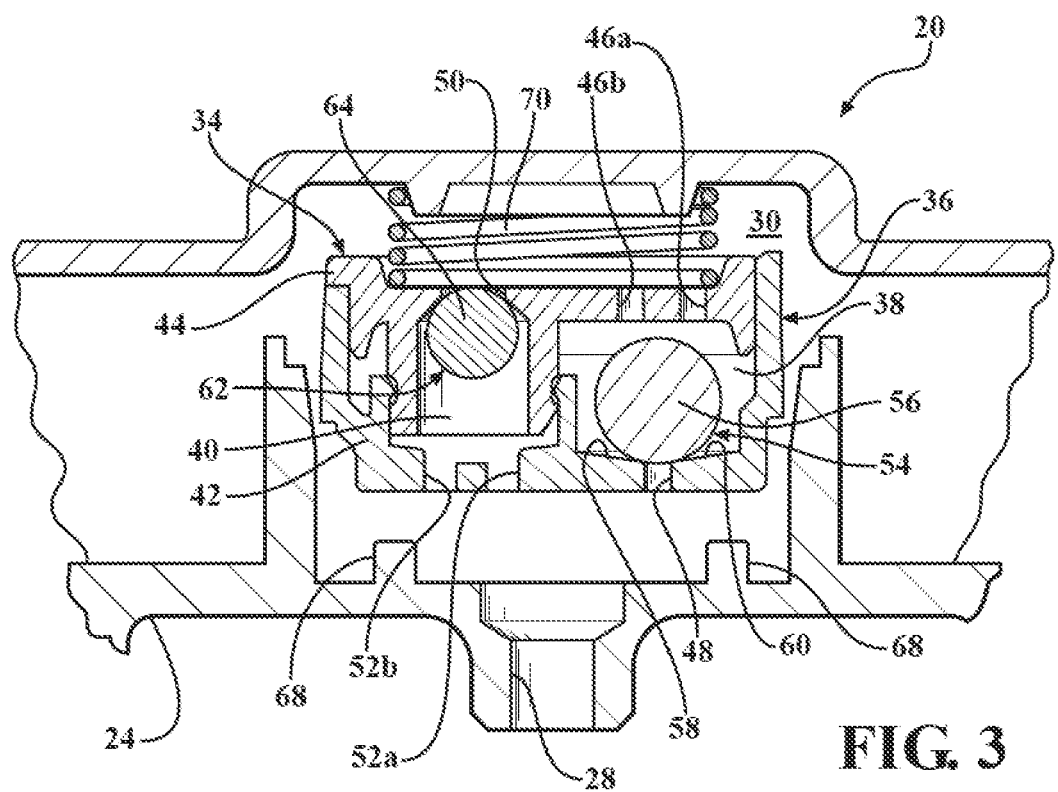
FIG. 3 is an enlarged partial schematic cross sectional view of the fuel vapor vent valve assembly, showing the anti-trickle valve in a second position.
Figure 4:
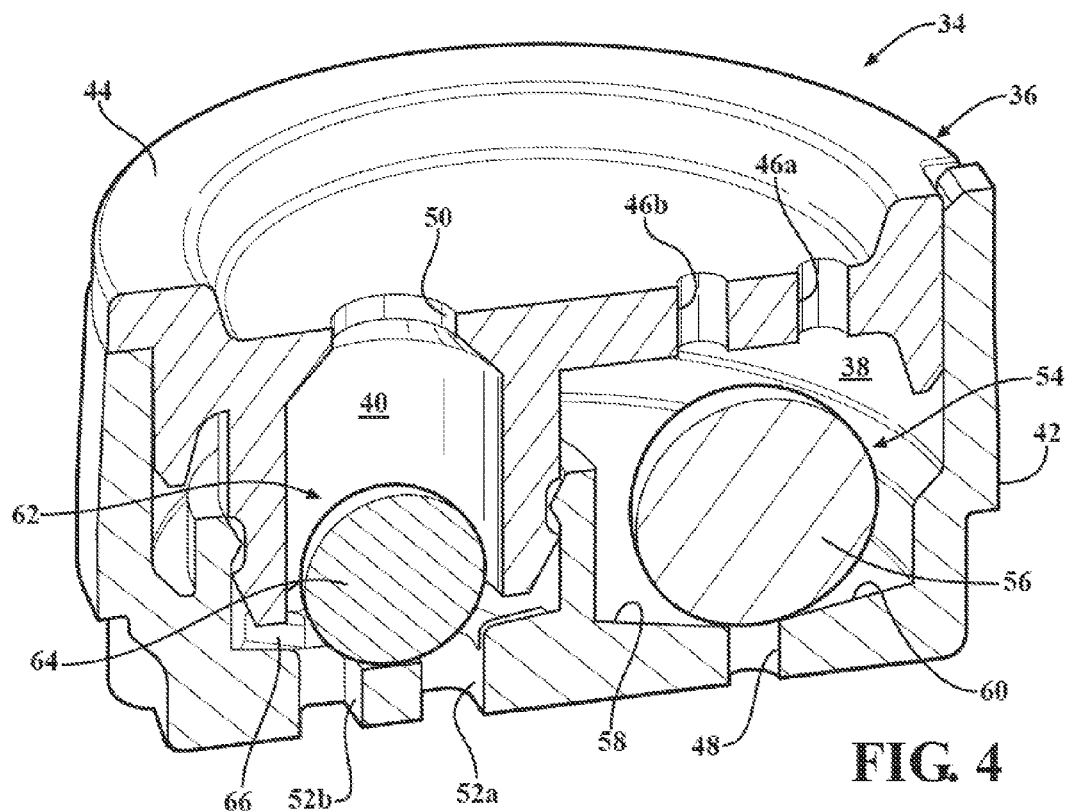
FIG. 4 is a schematic perspective cross sectional view of the anti-trickle valve when at rest and subjected to a vacuum pressure.

Referring also to FIGS. 2 through 4, the fuel vapor vent valve assembly 20 further includes an anti-trickle valve 34. The anti-trickle valve 34 is disposed within the interior opening 30 of the housing 24. The anti-trickle valve 34 opens and closes fluid communication between the interior opening 30 of the housing 24 and the first liquid/vapor discriminator 32a when the first liquid/vapor discriminator 32a is in the open position. The anti-trickle valve 34 opens and closes fluid communication, particularly vapor communication, to selectively allow fluid communication, i.e., vapor communication, between the interior opening 30 of the housing 24 and the interior of the fuel tank 22.

The anti-trickle valve 34 operates to prevent overfilling of the fuel tank 22, particularly when a low vapor pressure exists within the fuel tank 22. For example, during refueling of the fuel tank 22, when the second liquid/vapor discriminator 32b is completely closed due to a rise in the incoming fuel level, the anti-trickle valve 34 blocks the vapor port 28 to the first liquid/vapor discriminator 32a to prevent "trickle fill" of fuel into the fuel tank 22, and thereby prevent overfilling of the fuel tank 22.

The anti-trickle valve 34 includes a casing 36 defining a first cavity 38 and a second cavity 40 that is separate from the first cavity 38. The casing 36 may include a bottom portion 42 and an upper portion 44, with the upper portion 44 securely affixed to the bottom portion 42. The upper portion 44 and the bottom portion 42 cooperate to define the first cavity 38 and the second cavity 40.

The casing 36 defines an upper dynamic vapor passage 46a, 46b and a lower dynamic vapor passage 48. The upper dynamic vapor passage 46a, 46b is configured for communicating vapor between the interior opening 30 of the housing 24 and the first cavity 38. The lower dynamic vapor passage 48 is configured for communicating vapor between the first cavity 38 and the vapor port 28, and thereby to the liquid/vapor discriminator 32a. As shown, the upper dynamic vapor passage 46a, 46b may include, but is not limited to, a first upper dynamic vapor passage 46a and a second upper dynamic vapor passage 46b. The second upper dynamic vapor passage 46b is laterally offset and spaced from the first upper dynamic vapor passage 46a.

The casing 36 further defines an upper vacuum relief vapor passage 50 and a lower vacuum relief vapor passage 52a, 52b. The upper vacuum relief vapor passage 50 is configured for communicating vapor between the interior opening 30 of the housing 24 and the second cavity 40. The lower vacuum relief vapor passage 52a, 52b communicates vapor between the second cavity 40 and the vapor port 28, and thereby to the liquid/vapor discriminator 32. As shown, the lower vacuum relief vapor passage 52a, 52b may include, but is not limited to, a first lower vacuum relief vapor passage 52a and a second lower vacuum relief vapor passage 52b. The second lower vacuum relief vapor passage 52b is laterally offset and spaced from the first lower vacuum relief vapor passage 52a.

As shown, the bottom portion 42 of the casing 36 defines the lower dynamic vapor passage 48 and the lower vacuum relief vapor passage 52a, 52b, and the upper portion 44 defines the upper dynamic vapor passage 46a, 46b and the upper vacuum relief vapor passage 50. However, it should be appreciated that the casing 36 may be configured differently than as shown and described herein.

The anti-trickle valve 34 includes a dynamic pressure relief mechanism 54. The dynamic pressure relief mechanism 54 includes a movable element 56. The movable element 56 is configured for opening fluid communication, particularly vapor communication, between the interior opening 30 of the housing 24 and the vapor port 28, and more specifically with the liquid/vapor discriminator 32, in response to a change in motion. The movable element 56 opens fluid communication in response to movement of the vehicle to vent vapor pressure from the interior of the fuel tank 22 during movement of the vehicle. Accordingly, as vapor pressure builds during movement of the vehicle, for example, by the mixing of the fuel with the air in the fuel tank 22, or with an increased temperature of the fuel within the fuel tank 22, the movable element 56 moves to open vapor communication between interior opening 30 of the housing 24 and the fuel tank 22 to vent the increased vapor pressure.

The movable element 56 is disposed within the first cavity 38. As shown, the movable element 56 may include, but is not limited to, a spherical element. For example, movable element 56 may include a stainless steel ball. However, it should be appreciated that the movable element 56 may be configured other than shown and described herein.

Figure 5:
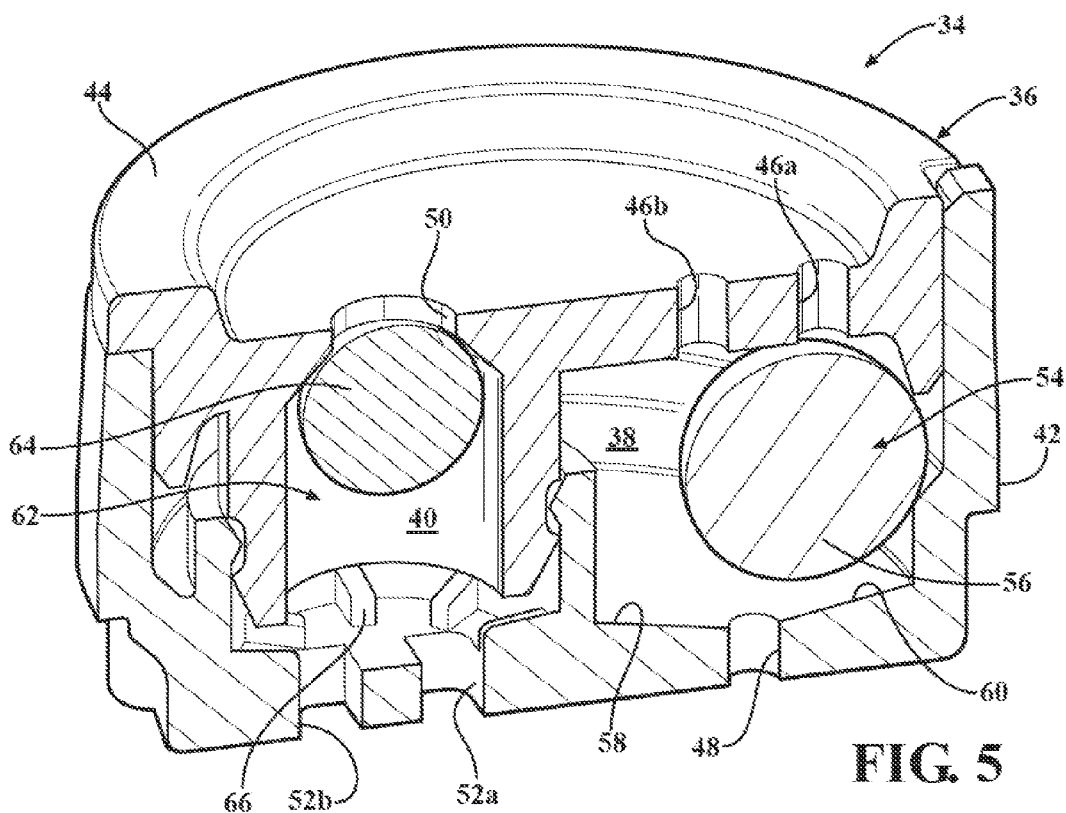
FIG. 5 is a schematic perspective cross sectional view of the anti-trickle valve during a change in motion and subjected to a positive vapor pressure.

The casing 36 of the anti-trickle valve 34 includes a concave ramp 58. More specifically, an upper surface 60 of the lower portion of the casing 36 defines the concave ramp 58. The concave ramp 58 is concentric with the lower dynamic vapor passage 48. As shown in FIG. 4, the concave ramp 58 centers the movable element 56 over the dynamic vapor passage when the vehicle is at rest. As such, when there is no change in valve motion, the movable element 56 moves down the concave ramp 58 into sealing engagement with the lower dynamic vapor passage 48 to prevent fluid communication, i.e., vapor communication between the fuel tank 22 and the outlet 26. As shown in FIG. 5, the movable element 56 is movable upward along the concave ramp 58 in response to a change in motion of the vehicle, i.e., acceleration of the vehicle, to open fluid communication between the upper dynamic vapor passage 46a, 46b and the lower dynamic vapor passage 48. Acceleration of the vehicle, i.e., a change in motion of the vehicle, may include, but is not limited to horizontal acceleration, vertical acceleration and/or radial acceleration. As such, as the vehicle changes motion, the movable element 56 moves up the concave ramp 58 out of sealing engagement with the lower dynamic vapor passage 48, to permit fluid communication, i.e., vapor communication, between the fuel tank 22 and the outlet 26.

The movable element 56 includes a mass sufficient for the movable element 56 to resist movement up the concave ramp 58 by vapor pressure having a value above a predetermined level. For example, the moveable element 56 may include a mass sufficient to resist movement up the concave ramp 58 by vapor pressure having a value of at least 3 kPa. It should be appreciated that the predetermined level may include a vapor pressure other than the 3 kPa described above, and may be set based upon any specific design considerations. Accordingly, a vapor pressure within the fuel tank 22, and more specifically at the vapor port 28, of below the predetermined level, e.g., below 3 kPa, will not move the movable element 56 up the concave ramp 58, while a vapor pressure greater than the predetermined level, e.g., greater than 3 kPa, may move the movable element 56 up the concave ramp 58, thereby opening fluid communication between the fuel tank 22 and the outlet 26.

The anti-trickle valve 34 includes a vacuum relief mechanism 62. The vacuum relief mechanism 62 opens fluid communication between the interior opening 30 of the housing 24 and the vapor port 28, and more specifically the liquid/vapor discriminator 32a, to relieve vacuum pressure within the fuel tank 22.

The vacuum relief mechanism 62 includes a float 64 disposed within the second cavity 40. The float 64 may include, but is not limited to, a plastic spherical ball or the like. As shown, the upper vacuum relief vapor passage 50 includes a circular port. As shown in FIG. 5, the float 64 is configured to seal against the circular port of the upper vacuum relief vapor passage 50 in response to the vapor pressure from within the fuel tank 22 having a value greater than a selected vacuum level, such as 0 kPa, to bias the float 64 upwards. Accordingly, when the vapor pressure at the vapor port 28, and more specifically when the vapor pressure at the fuel tank 22, is greater than 0 kPa in this example, the vapor pressure moves the float 64 into sealing engagement with the upper vacuum relief vapor passage 50 to block fluid communication, particularly vapor communication, between the interior opening 30 of the housing 24 and the fuel tank 22. As shown in FIG. 4, the float 64 is configured to withdraw from sealing engagement with the circular port of the upper vacuum relief vapor passage 50 in response to a vacuum pressure from within the fuel tank 22, which draws the float 64 downwards to open fluid communication between the upper vacuum relief vapor passage 50 and the lower vacuum relief vapor passage 52a, 52b. Accordingly, when a selected vacuum pressure level, i.e., a pressure less than 0 kPa, exists at the vapor port 28, and more specifically within the fuel tank 22, then the vacuum pressure draws the float 64 vertically downward away from and out of sealing engagement with the upper vacuum relief vapor passage 50, thereby opening fluid communication, and particularly vapor communication, between the interior opening 30 of the housing 24 and the fuel tank 22 to permit air to enter the fuel tank 22 and fill the vacuum.

As shown in FIGS. 4 and 5, the casing 36 may include a plurality of ribs 66 radially spaced about and adjacent the lower vacuum relief vapor passage 52a, 52b. More specifically, the upper surface 60 of the lower portion of the casing 36 defines the ribs 66. The ribs 66 vertically space the float 64 from the lower vacuum relief vapor passage 52a, 52b when the float 64 is drawn vertically downward by a vacuum pressure. As such, the ribs 66 prevent the vacuum pressure from drawing the float 64 downward into sealing engagement with the lower vacuum relief vapor passage 52.

Referring back to the embodiment in FIGS. 2 and 3, the housing 24 includes a ridge 68 disposed circumferentially about the vapor port 28, the lower dynamic vapor passage 48 and the lower vacuum relief vapor passage 52a, 52b. It should be appreciated that the ridge 68 may include any suitable shape, including but not limited to, a circular shape or a rectangular shape.

The anti-trickle valve 34 is movable between a first position, shown in FIG. 2, and a second position, shown in FIG. 3. When in the first position, the anti-trickle valve 34 is disposed in sealing engagement with the ridge 68 to seal the vapor port 28, the lower dynamic vapor passage 48 and the lower vacuum relief vapor passage 52a, 52b from the interior opening 30 of the housing 24. When in the second position, the anti-trickle valve 34 is vertically spaced from the ridge 68 to permit fluid communication, and particularly vapor communication, around a periphery of the anti-trickle valve 34 between the vapor port 28 and the outlet 26. The housing 24 may define a plurality of flow channels (not shown) disposed about the periphery of the casing 36 to facilitate fluid communication around the periphery of the anti-trickle valve 34.

The fuel vapor vent valve assembly 20 further includes a biasing device 70. The biasing device 70 is configured for biasing the anti-trickle valve 34 into the first position. The biasing device 70 may include, but is not limited to, a coil spring or the like. The biasing device 70 has a stiffness sufficient to resist movement of the anti-trickle valve 34 when it responds to a vapor pressure from within the fuel tank 22 having a value less than a first predetermined value (e.g., less than 3 kPa). Accordingly, if the vapor pressure within the fuel tank 22 and at the vapor port 28 is less than 3 kPa, then the biasing device 70 maintains the anti-trickle valve 34 in the first position. However, if the vapor pressure within the fuel tank 22 and at the vapor port 28 rises to above 3 kPa, then the pressure exerted on the anti-trickle valve 34 from the vapor pressure is sufficient to move the biasing device 70, e.g., compress the coil spring, and move the anti-trickle valve 34 into the second position. When in the second position, large quantities of vapor from within the fuel tank 22 may escape in a short amount of time.

While the best modes for carrying out the invention have been described in detail, those familiar with the art to which this invention relates will recognize various alternative designs and embodiments for practicing the invention within the scope of the appended claims.

The invention claimed is:

1. A fuel vapor vent valve assembly for a fuel tank, the fuel vapor vent valve assembly comprising:
   a housing including an outlet and defining an interior opening in fluid communication with the outlet;
   a liquid/vapor discriminator coupled to the housing and movable between an open position and a closed position, wherein the liquid/vapor discriminator allows fluid communication between an interior of the fuel tank and the interior opening of the housing in the open position, and the liquid/vapor discriminator prevents fluid communication between the interior of the fuel tank and the interior opening of the housing in the closed position; and
   an anti-trickle valve disposed within the interior opening of the housing to open and close fluid communication between the interior opening of the housing and the liquid/vapor discriminator to selectively allow fluid communication between the interior opening of the housing and the interior of the fuel tank when the liquid/vapor discriminator is in the open position;
   wherein the anti-trickle valve includes:
      a casing defining a first cavity having a dynamic pressure relief mechanism disposed therein, and a second cavity having a vacuum relief mechanism disposed therein;
      wherein the casing defines an upper dynamic vapor passage and a lower dynamic vapor passage, with the upper dynamic vapor passage configured for communicating vapor between the interior opening of the housing and the first cavity, and the lower dynamic vapor passage configured for communicating vapor between the first cavity and the liquid/vapor discriminator;
      wherein the dynamic pressure relief mechanism includes a movable element disposed within the first cavity that opens fluid communication between the interior opening of the housing and the liquid/vapor discriminator in response to a change in motion of the moveable element to vent vapor pressure from the interior of the fuel tank;
      wherein the casing includes a concave ramp disposed concentric with the lower dynamic vapor passage and operable to center the movable element over the dynamic vapor passage when at rest, with the movable element movable upward along the concave ramp in response to a change in motion to open fluid communication between the upper dynamic vapor passage and the lower dynamic vapor passage;
      wherein the casing defines an upper vacuum relief vapor passage and a lower vacuum relief vapor passage, with the upper vacuum relief vapor passage configured for communicating vapor between the interior opening of the housing and the second cavity, and the lower vacuum relief vapor passage configured for communicating vapor between the second cavity and the liquid/vapor discriminator; and
      wherein the vacuum relief mechanism includes a float disposed within the second cavity, wherein the float is configured to seal against the upper vacuum relief vapor passage in response to a vapor pressure from within the fuel tank that exceeds a selected vacuum level to close fluid communication between the upper vacuum relief vapor passage and the lower vacuum relief vapor passage, and wherein the float is configured to withdraw from sealing engagement with the upper vacuum relief vapor passage in response to a vacuum pressure from within the fuel tank that is less than the selected vacuum level to open fluid communication between the upper vacuum relief vapor passage and the lower vacuum relief vapor passage.

2. A fuel vapor vent valve assembly as set forth in claim 1 wherein the movable element includes a spherical element.

3. A fuel vapor vent valve assembly as set forth in claim 2 wherein the movable element includes a mass sufficient to resist movement up the concave ramp by vapor pressure having a value greater than a predetermined level.

4. A fuel vapor vent valve assembly as set forth in claim 3 wherein the movable element includes a stainless steel ball.

5. A fuel vapor vent valve assembly as set forth in claim 1 wherein the casing includes a plurality of ribs radially spaced about and adjacent the lower vacuum relief vapor passage.

6. A fuel vapor vent valve assembly as set forth in claim 1 wherein the housing defines a vapor port interconnecting the interior opening and the liquid/vapor discriminator.

7. A fuel vapor vent valve assembly as set forth in claim 6 wherein the housing includes a ridge disposed circumferentially about the vapor port, the lower dynamic vapor passage and the lower vacuum relief vapor passage, wherein the anti-trickle valve is movable between a first position where the anti-trickle valve is in sealing engagement with the ridge to seal the vapor port, the lower dynamic vapor passage and the lower vacuum relief vapor passage from the interior opening of the housing, and a second position where the anti-trickle valve is spaced from the ridge to permit fluid communication around a periphery of the anti-trickle valve between the vapor port and the outlet.

8. A fuel vapor vent valve assembly as set forth in claim 7 further including a biasing device configured for biasing the anti-trickle valve into the first position.

9. A fuel vapor vent valve assembly as set forth in claim 8 wherein the biasing device includes a stiffness sufficient to resist movement of the anti-trickle valve in response to a vapor pressure from within the fuel tank having a value less than a predetermined level.

10. An anti-trickle valve for a fuel vapor vent assembly of a fuel tank, the anti-trickle valve comprising:
   a casing including an upper portion defining an upper dynamic vapor passage and an upper vacuum relief vapor passage, and a lower portion defining a lower dynamic vapor passage and a lower vacuum relief vapor passage, wherein the upper portion and the lower portion of the casing cooperate to define a first cavity in fluid communication with the upper dynamic vapor passage and the lower dynamic vapor passage, and a second cavity in fluid communication with the upper vacuum relief vapor passage and the lower vacuum relief vapor passage;

a float disposed within the second cavity, wherein the float seals against the upper vacuum relief vapor passage when a vapor pressure in the fuel tank exceeds a selected vacuum level and withdraws from sealing engagement with the upper vacuum relief vapor passage when a vacuum pressure in the fuel tank is below the selected vacuum level to open fluid communication between the upper vacuum relief vapor passage and the lower vacuum relief vapor passage;

a movable element disposed within the first cavity and operable to open fluid communication between the upper dynamic vapor passage and the lower dynamic vapor passage in response to a change in motion of the moveable element to vent vapor pressure from within the fuel tank.

11. An anti-trickle valve as set forth in claim 10 wherein the casing includes a concave ramp concentric with the lower dynamic vapor passage and configured for centering the movable element over the dynamic vapor passage when at rest, wherein the movable element moves upward along the concave ramp in response to the change in motion to open fluid communication between the upper dynamic vapor passage and the lower dynamic vapor passage.

12. An anti-trickle valve as set forth in claim 11 wherein the movable element includes a spherical stainless steel ball having a mass sufficient to resist movement up the concave ramp by a vapor pressure having a value greater than a predetermined level.

13. A fuel vapor vent valve assembly for a fuel tank, the fuel vapor vent valve assembly comprising:

a housing including an outlet and defining an interior opening in fluid communication with the outlet;

a liquid/vapor discriminator coupled to the housing and movable between an open position and a closed position, wherein the liquid/vapor discriminator allows fluid communication between an interior of the fuel tank and the interior opening of the housing in the open position, and the liquid/vapor discriminator prevents fluid communication between the interior of the fuel tank and the interior opening of the housing in the closed position; and an anti-trickle valve disposed within the interior opening of the housing to open and close fluid communication between the interior opening of the housing and the liquid/vapor discriminator to selectively allow fluid communication between the interior opening of the housing and the interior of the fuel tank when the liquid/vapor discriminator is in the open position;

wherein the anti-trickle valve includes:

a casing defining an upper dynamic vapor passage, an upper vacuum relief vapor passage, a lower dynamic vapor passage, and a lower vacuum relief vapor passage, wherein the casing defines a first cavity in fluid communication with the upper dynamic vapor passage and the lower dynamic vapor passage, and a second cavity in fluid communication with the upper vacuum relief vapor passage and the lower vacuum relief vapor passage;

a float disposed within the second cavity, wherein the float seals against the upper vacuum relief vapor passage when a vapor pressure in the fuel tank exceeds a selected vacuum level and withdraws from sealing engagement with the upper vacuum relief vapor passage when a vacuum pressure in the fuel tank is below the selected vacuum level to open fluid communication between the upper vacuum relief vapor passage and the lower vacuum relief vapor passage; and a movable element disposed within the first cavity and operable to open fluid communication between the upper dynamic vapor passage and the lower dynamic vapor passage in response to a change in motion of the moveable element to vent vapor pressure from within the fuel tank.

14. A fuel vapor vent valve assembly as set forth in claim 13 wherein the casing includes an upper portion and a lower portion, with the upper portion attached to the lower portion and cooperating with the lower portion to define the first cavity and the second cavity.

15. A fuel vapor vent valve assembly as set forth in claim 13 wherein the casing includes a concave ramp disposed concentric with the lower dynamic vapor passage and operable to center the movable element over the dynamic vapor passage when at rest, with the movable element movable upward along the concave ramp in response to a change in motion to open fluid communication between the upper dynamic vapor passage and the lower dynamic vapor passage.

16. A fuel vapor vent valve assembly as set forth in claim 13 wherein the movable element includes a spherical element.

17. A fuel vapor vent valve assembly as set forth in claim 16 wherein the movable element includes a stainless steel ball.

18. A fuel vapor vent valve assembly as set forth in claim 13 wherein the casing includes a plurality of ribs radially spaced about and adjacent the lower vacuum relief vapor passage.

19. A fuel vapor vent valve assembly as set forth in claim 13 wherein the housing defines a vapor port interconnecting the interior opening and the liquid/vapor discriminator, and wherein the housing includes a ridge disposed circumferentially about the vapor port, the lower dynamic vapor passage and the lower vacuum relief vapor passage, wherein the anti-trickle valve is movable between a first position with the anti-trickle valve disposed in sealing engagement with the ridge to seal the vapor port, the lower dynamic vapor passage and the lower vacuum relief vapor passage from the interior opening of the housing, and a second position with the anti-trickle valve spaced from the ridge to permit fluid communication around a periphery of the anti-trickle valve between the vapor port and the outlet.

20. A fuel vapor vent valve assembly as set forth in claim 19 further including a biasing device configured for biasing the anti-trickle valve into the first position.

* * * * *